United States Patent
Sakamoto

(10) Patent No.: US 11,294,821 B1
(45) Date of Patent: Apr. 5, 2022

(54) WRITE-BACK CACHE DEVICE

(71) Applicants: Kabushiki Kaisha Toshiba, Tokyo (JP); Toshiba Electronic Devices & Storage Corporation, Tokyo (JP)

(72) Inventor: Nobuaki Sakamoto, Kawasaki Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/186,192

(22) Filed: Feb. 26, 2021

(30) Foreign Application Priority Data

Sep. 11, 2020 (JP) .............................. JP2020-152700

(51) Int. Cl.
- *G06F 12/08* (2016.01)
- *G06F 12/0891* (2016.01)
- *G06F 12/02* (2006.01)
- *G06F 12/0804* (2016.01)

(52) U.S. Cl.
CPC ...... *G06F 12/0891* (2013.01); *G06F 12/0238* (2013.01); *G06F 12/0804* (2013.01)

(58) Field of Classification Search
CPC ............ G06F 12/0891; G06F 12/0804; G06F 12/0238
See application file for complete search history.

(56) References Cited

U.S. PATENT DOCUMENTS

| | | | |
|---|---|---|---|
| 6,931,495 B2 | 8/2005 | Nakada | |
| 8,612,692 B2 | 12/2013 | Yasufuku et al. | |
| 9,218,287 B2 | 12/2015 | Miyazaki et al. | |
| 10,296,466 B2 | 5/2019 | Kato | |
| 2010/0333098 A1* | 12/2010 | Jordan | G06F 9/384 718/103 |
| 2016/0055095 A1* | 2/2016 | Faraboschi | G06F 3/061 711/118 |
| 2019/0391924 A1* | 12/2019 | Hirano | G06F 12/0811 |

FOREIGN PATENT DOCUMENTS

| | | |
|---|---|---|
| JP | 3013781 B2 | 2/2000 |
| JP | 4434534 B2 | 3/2010 |
| JP | 2012-033047 A | 2/2012 |
| JP | 6711121 B2 | 6/2020 |
| WO | 2012-102002 A1 | 8/2012 |

OTHER PUBLICATIONS

Morteza Hoseinzadeh, "A Survey on Tiering and Caching in High-Performance Storage Systems", EEE Transactions on Computers (vol. 65, Issue: 7, pp. 2169-2183), Sep. 17, 2015.*

* cited by examiner

*Primary Examiner* — Pierre Miche Bataille
(74) *Attorney, Agent, or Firm* — Allen & Overy LLP

(57) ABSTRACT

A write-back cache device of an embodiment includes a first storage device capable of storing n pieces of unit data in each of a plurality of cache lines, a second storage device configured to store state instruction data in each of the plurality of cache lines, and a cache controller configured to control inputting to and outputting from the first and second storage devices. The state instruction data has a first value when data in a cache line is not different from data in a main memory, has a second value when two or more pieces of unit data are different from data in the main memory, or has a third value when only one piece of unit data is different from data in the main memory.

8 Claims, 12 Drawing Sheets

| 3 STATES INDICATED BY STATE INSTRUCTION DATA | UNIT DATA POSITION | STATE INSTRUCTION DATA VALUE |
|---|---|---|
| FIRST STATE | – | 0 |
| THIRD STATE | 0 | 1 |
| | 1 | 2 |
| | 2 | 3 |
| | 3 | 4 |
| | 4 | 5 |
| | 5 | 6 |
| | 6 | 7 |
| | 7 | 8 |
| SECOND STATE | N/A | 15 |

FIG. 3

| ADDRESS IN MAIN MEMORY | | |
|---|---|---|
| TAG TG | INDEX IDX | CACHE LINE SIZE LSZ |

FIG. 4

| IDX | FIRST STORAGE DEVICE | | | | SECOND STORAGE DEVICE | THIRD STORAGE DEVICE |
|---|---|---|---|---|---|---|
| 0 | UNIT DATA UD0 | UNIT DATA UD1 | ... | UNIT DATA UD(n−1) | STATE INSTRUCTION DATA SID | TAG TG |
| 1 | UNIT DATA UD0 | UNIT DATA UD1 | ... | UNIT DATA UD(n−1) | STATE INSTRUCTION DATA SID | TAG TG |
| ... | ... | ... | ... | ... | ... | ... |
| i−1 | UNIT DATA UD0 | UNIT DATA UD1 | ... | UNIT DATA UD(n−1) | STATE INSTRUCTION DATA SID | TAG TG |

FIG. 5

| 3 STATES INDICATED BY STATE INSTRUCTION DATA | UNIT DATA POSITION | STATE INSTRUCTION DATA VALUE |
|---|---|---|
| FIRST STATE | - | 0 |
| THIRD STATE | 0 | 1 |
| | 1 | 2 |
| | 2 | 3 |
| | 3 | 4 |
| | 4 | 5 |
| | 5 | 6 |
| | 6 | 7 |
| | 7 | 8 |
| SECOND STATE | N/A | 15 |

FIG. 11

| IDX | FIRST STORAGE DEVICE | | | | SECOND STORAGE DEVICE | THIRD STORAGE DEVICE |
|---|---|---|---|---|---|---|
| 0 | UNIT DATA UD0 | UNIT DATA UD1 | ... | UNIT DATA UD(n−1) | DIRTY BIT DB | TAG TG |
| 1 | UNIT DATA UD0 | UNIT DATA UD1 | ... | UNIT DATA UD(n−1) | DIRTY BIT DB | TAG TG |
| ... | ... | ... | ... | ... | ... | ... |
| i−1 | UNIT DATA UD0 | UNIT DATA UD1 | ... | UNIT DATA UD(n−1) | DIRTY BIT DB | TAG TG |

FIG. 12

| IDX | UD0 | UD1 | ... | UD(n-1) |
|---|---|---|---|---|
| 0 | DIRTY BIT DB | DIRTY BIT DB | ... | DIRTY BIT DB |
| 1 | DIRTY BIT DB | DIRTY BIT DB | ... | DIRTY BIT DB |
| ... | ... | ... | ... | ... |
| i-1 | DIRTY BIT DB | DIRTY BIT DB | ... | DIRTY BIT DB |

FIG. 13

| OPERATION CYCLE | 1 | 2 | 3 | 4 |
|---|---|---|---|---|
| INPUT ACCESS | $W_0$ | | $W_1$ | |
| TAG | $R_0$ | | $R_1$ | |
| UNIT DATA | | $W_0$ | | $W_1$ |
| STATE INSTRUCTION DATA | $R_0$ | $W_0$ | $R_1$ | $W_1$ |

WRITE-BACK CACHE DEVICE

CROSS-REFERENCE TO RELATED APPLICATIONS

This application is based upon and claims the benefit of priority from the prior Japanese Patent Application No. 2020-152700 filed in Japan on Sep. 11, 2020; the entire contents of which are incorporated herein by reference.

FIELD

Embodiments described herein relate generally to a write-back cache device.

BACKGROUND

Recently, it has been discussed to employ, as a main memory of a computer, a non-volatile memory such as an MRAM.

Typically, a non-volatile memory such as an MRAM has properties such as a limited number of times that writing is possible, large current consumption at writing, and high latency at writing.

Thus, it is required to reduce the number of times of writing to the main memory and the amount of writing data, and a write-back cache memory (hereinafter, a "cache memory" is simply referred to as a "cache" as appropriate) is used as effective means.

A write-back cache includes a plurality of cache lines in each of which, for example, a plurality of pieces of unit data (unit data is, for example, word data) are stored. Whether data yet to be written to the main memory exists in a cache line is managed in units of cache lines by using a dirty bit.

In a case of clean (bit value 0), the dirty bit indicates that the data in the cache line is already written to the main memory. In a case of dirty (bit value 1), the dirty bit indicates that the data in the cache line is yet to be written to the main memory. Thus, the data in the cache line is written to the main memory when the dirty bit is dirty.

However, in the configuration in which one dirty bit is allocated to one cache line, even if only one piece of unit data in a cache line is yet to be written to a main memory for example, all pieces of unit data in the cache line are written to the main memory, which results in an increase in the amount of data to be written to the main memory.

BRIEF DESCRIPTION OF THE DRAWINGS

FIG. 3 is a table for description of a relation between an address in the main memory and each of a tag, an index, and a cache line size according to the first embodiment;

FIG. 4 is a table for description of an example of data stored in first to third storage devices according to the first embodiment;

FIG. 5 is a table illustrating a specific example of values of state instruction data according to the first embodiment;

FIG. 11 is a table for description of a first comparative example in which one dirty bit corresponds to one cache line;

FIG. 12 is a table for description of a second comparative example in which dirty bits correspond to a plurality of respective pieces of unit data in one cache line; and FIG. 13 is a timing chart illustrating a third comparative example in which stall occurs due to a consecutive request for writing of unit data.

DETAILED DESCRIPTION

A write-back cache device of an embodiment includes: a first storage device capable of storing n (n is an integer equal to or larger than two) pieces of unit data in each of a plurality of cache lines, each piece of unit data being a unit of writing to a main memory; a second storage device configured to store state instruction data in each of the plurality of cache lines; and a cache controller configured to control inputting to and outputting from the first and second storage devices. In a first state in which n pieces of unit data stored in a first cache line in the first storage device are not different from data stored at a first address in the main memory, the first address corresponding to the first cache line, first state instruction data in the first cache line has a first value. In a second state in which two or more pieces of unit data among the n pieces of unit data stored in the first cache line are different from data stored at the first address, the first state instruction data has a second value. When one piece of unit data among the n pieces of unit data stored in the first cache line is first unit data in a third state in which only the one piece of unit data is different from data stored at the first address, the first state instruction data has a third value.

Embodiments will be described below with reference to the accompanying drawings.

First Embodiment (Configuration)

Figure 1:
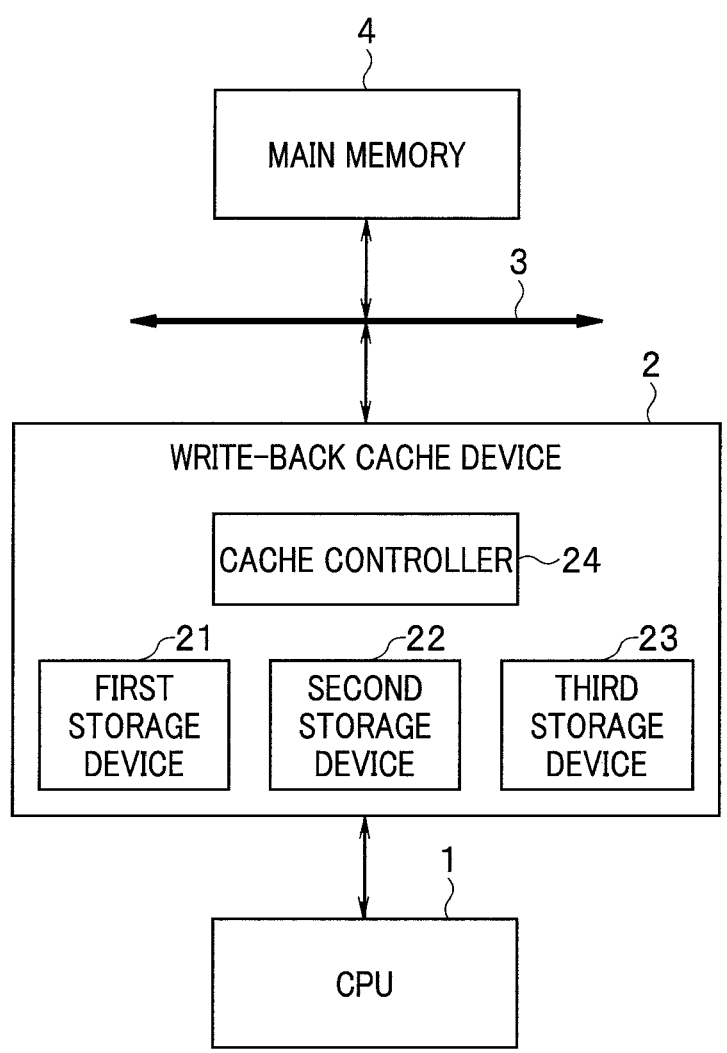
FIG. 1 is a diagram illustrating the configuration of a computer including a write-back cache device according to a first embodiment.

FIG. 1 is a diagram illustrating the configuration of a computer including a write-back cache device 2 according to the present embodiment.

The computer includes a CPU 1, the write-back cache device 2, a bus 3, and a main memory 4.

The CPU 1 is a central processing unit configured to process information by sequentially reading, interpreting, and executing computer programs, data, and the like stored in the main memory 4.

The bus 3 is a common transmission path through which a plurality of devices transmit instructions and data.

The main memory 4 is configured with a non-volatile memory such as an MRAM. The main memory 4 stores, for example, a computer program to be executed by the CPU 1, and data to be processed by the CPU 1 through execution of the computer program.

The CPU 1 reads computer programs, data, and the like from the main memory 4 through the bus 3, and stores processing results in the main memory 4 through the bus 3.

The write-back cache device 2 is provided between the CPU 1 and the bus 3 to reduce the number of times of writing and the amount of data written to the main memory 4 configured with a non-volatile memory.

Until write-back operation is performed, the write-back cache device 2 updates only data in the write-back cache device 2 but not data in the main memory 4. As a result, the data stored in the main memory 4 and the data stored in the write-back cache device 2 become different from each other in some cases. However, when the write-back operation to write the data stored in the write-back cache device 2 to the main memory 4 is performed, the difference is eliminated and data match between the main memory 4 and the write-back cache device 2.

The write-back cache device 2 includes a first storage device 21, a second storage device 22, a third storage device 23, and a cache controller 24.

Figure 2:
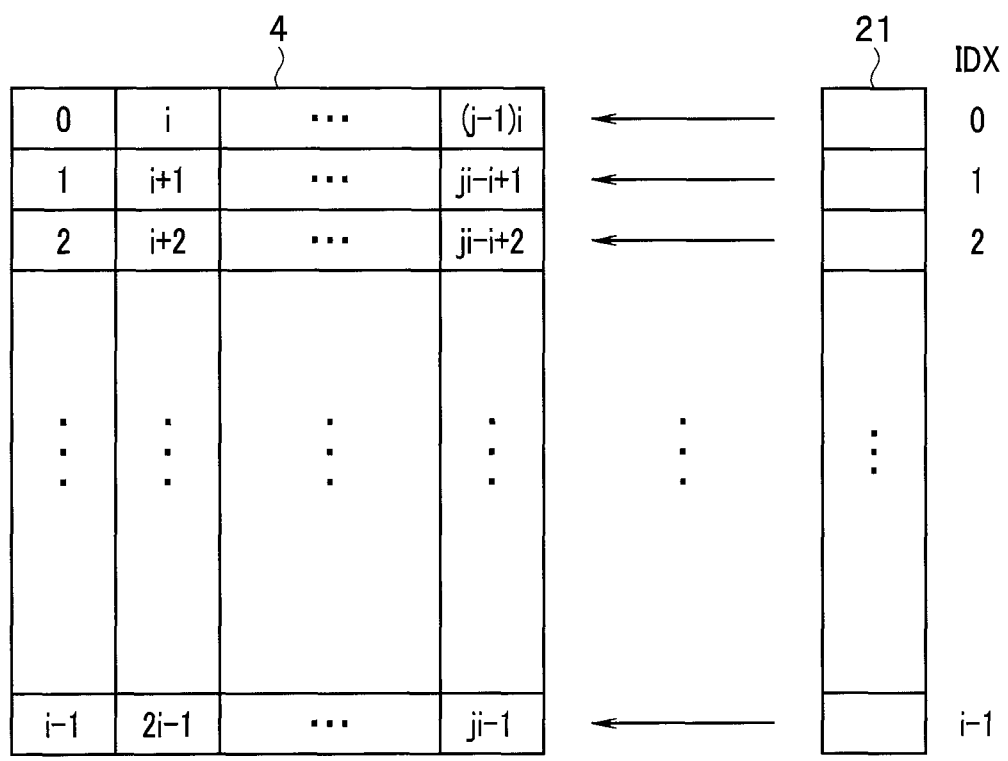
FIG. 2 is a diagram for description of a correspondence relation between cache line data stored in a first storage device and data stored in a main memory according to the first embodiment.

FIG. 2 is a diagram for description of a correspondence relation between cache line data stored in the first storage device 21 and data stored in the main memory 4. FIG. 3 is a table for description of a relation between an address in the main memory 4 and each of a tag TG, an index IDX, and a cache line size LSZ. FIG. 4 is a table for description of an example of data stored in the first storage device 21, the second storage device 22, and the third storage device 23.

The write-back cache device 2 includes a cache line, and one cache line is indicated as one row in FIG. 4. Specifically, a cache line is a storage region provided across the first storage device 21, the second storage device 22, and the third storage device 23 and specified by the index IDX. As illustrated in FIG. 4, the write-back cache device 2 includes a cache line array in which a plurality (in the example illustrated in FIG. 4, i (i is a positive integer)) of cache lines each indicated as one row are arrayed in a column direction.

The first storage device 21 can store, in one cache line, n (n is an integer equal to or larger than two) pieces of unit data UD as a unit of writing to the main memory 4. The unit data UD is, for example, word data (for example, 16-bit data) or double word data but not limited to these kinds of data and may be data of any number of bits. Cache line data is n pieces of unit data (unit data UD0 to UD(n−1) illustrated in FIG. 4) stored in the first storage device 21 for one cache line.

In FIG. 2, each rectangle partitioned by grid lines represents data having the data size of one piece of cache line data. When the first storage device 21 can store i pieces of cache line data, the main memory 4 having a storage capacity larger than a storage capacity of the first storage device 21 can store data having the data size of (i×j) (j is a positive integer) pieces of cache line data.

A place in which data is stored in the main memory 4 is specified by an address. The cache controller 24 decodes an address in the main memory 4, which is forwarded together with unit data UD, into the cache line size LSZ at a low level, the index IDX at an intermediate level, and the tag TG as illustrated in FIG. 3.

The tag TG specifies a column number (0 to (j−1)) in the main memory 4 illustrated in FIG. 2. The index IDX specifies a row number (0 to (i−1)) in the main memory 4 illustrated in FIG. 2 and a cache line in the write-back cache device 2. The cache line size LSZ specifies the position (0 to (n−1)) of unit data UD in data having the data size of cache line data.

The second storage device 22 stores state instruction data SID in each of a plurality of cache lines. The second storage device 22 is configured with, for example, a flip-flop or an SRAM.

The third storage device 23 stores the tag TG in each of a plurality of cache lines.

The cache controller 24 is a control circuit configured to control inputting to and outputting from the first storage device 21, the second storage device 22, and the third storage device 23.

When unit data UD and an address in the main memory 4 are forwarded from the CPU 1 to the write-back cache device 2, the cache controller 24 stores, in a cache line specified by an index IDX in the third storage device 23, a tag TG obtained by decoding the address in the main memory 4. The cache controller 24 stores the unit data UD at a position specified by a cache line size LSZ in the cache line specified by the index IDX in the first storage device 21. The cache controller 24 rewrites, as described later with reference to FIG. 7, state instruction data SID stored in the cache line specified by the index IDX in the second storage device 22.

In addition, the cache controller 24 performs the write-back operation to write, to the main memory 4, unit data UD stored in a cache line in the first storage device 21. Then, when cache line data in a cache line has written to the main memory 4, the cache controller 24 performs control to rewrite the value of state instruction data SID in the cache line to a value indicating a first state. The first state is a state in which data stored at a first address in the main memory 4 is not different from n pieces of unit data stored in a first cache line in the first storage device 21, the first cache line corresponding to the first address.

FIG. 11 is a table for description of a first comparative example in which one dirty bit DB corresponds to one cache line.

The dirty bit DB is one-bit data holding information of whether cache line data stored in the same cache line in the first storage device 21 is "dirty" (bit value 1) or "clean" (bit value 0).

"Dirty" indicates that the data stored at the first address in the main memory 4 is different from the cache line data stored in the first cache line in the first storage device 21, the first cache line corresponding to the first address.

"Clean" indicates that the data stored at the first address in the main memory 4 is not different from the cache line data stored in the first cache line in the first storage device 21, the first cache line corresponding to the first address.

With the configuration of the first comparative example, for example, when only one piece of unit data UD in cache line data (n pieces of unit data UD) is yet to be written to the main memory 4, all n pieces of unit data UD are written to the main memory 4 through the write-back operation.

FIG. 12 is a table for description of a second comparative example in which dirty bits DB correspond to a plurality of respective pieces of unit data UD in one cache line. In FIG. 12, illustration of data stored in the first storage device 21 and the third storage device 23 is omitted, and only data stored in the second storage device 22 is illustrated.

As illustrated in FIG. 12, when n dirty bits DB are provided for n pieces, respectively, of unit data UD, it is possible to determine which of the n pieces of unit data UD is "dirty" or "clean". Then, when the write-back operation is performed, only dirty unit data UD is written to the main memory 4, which achieves reduction of the amount of data written to the main memory 4.

However, in the second comparative example illustrated in FIG. 12, the second storage device 22 needs a storage capacity n times larger than in the first comparative example illustrated in FIG. 11, which leads to increase of circuit dimensions.

Research has found out that the number of pieces of dirty unit data UD in one cache line at writing to the main memory 4 is one in a large fraction of cache lines. One reason for this research result is thought to be that when there are a plurality of global variables (variables accessible from every scope in computer programming), these variables are stored and accessed at every other address in the main memory 4.

Thus, in the present embodiment, the second storage device 22 employs a configuration as illustrated in FIG. 4.

The second storage device 22 of the present embodiment stores state instruction data SID configured with a plurality of bits in one cache line.

The state instruction data SID is configured with bits in a number smaller than n with which it is possible to distinguish a total of (n+2) states of one first state in which all n pieces of unit data UD stored in one cache line are "clean", one second state in which two or more of the n pieces of unit data UD are "dirty", and n sub states each corresponding to a position at which unit data UD is "dirty" in a third state in which only one of the n pieces of unit data UD is "dirty". Accordingly, it is possible to reduce the number of bits of state instruction data SID stored in the second storage device 22 as compared to the second comparative example illustrated in FIG. 12, and thus reduce circuit dimensions of the second storage device 22.

The state instruction data SID is more preferably configured with a minimum number of bits with which (n+2) states can be distinguished from one another. Accordingly, the circuit dimensions of the second storage device 22 can be minimized.

FIG. 5 is a table illustrating a specific example of values of the state instruction data SID. FIG. 5 corresponds to an example in which the number n of pieces of unit data UD stored in one cache line is eight.

When positions of the eight pieces of unit data UD in the cache line are indicated by numbers 0 to 7, the state instruction data SID is configured with data of four bits, which is a minimum number of bits with which 10 states can be distinguished from one another. With this configuration, the data amount of the state instruction data SID in one cache line is half the data amount of the configuration of FIG. 12 in which eight dirty bits DB are provided.

However, since the number of bits smaller than eight bits is smaller than the number of bits for the configuration of FIG. 12, the state instruction data SID may be configured with five to seven bits.

The state instruction data SID of four bits can have a decimal value of 0 to 15. For example, the value of the state instruction data SID is set to be zero in a case of the above-described first state, and the value of the state instruction data SID is set to be 15 irrespective of positions at which two pieces of unit data UD are "dirty" in a case of the above-described second state. In a case of the above-described third state, the value of the state instruction data SID is set to be one to eight corresponding to respective sub states in which the position of dirty unit data UD is 0 to 7.

For example, when the values illustrated in FIG. 5 are allocated to the state instruction data SID, it is possible to determine which of the first to third states cache line data is in and determine, in a case of the third state, a sub state corresponding a position at which unit data UD is "dirty".

Figure 6:
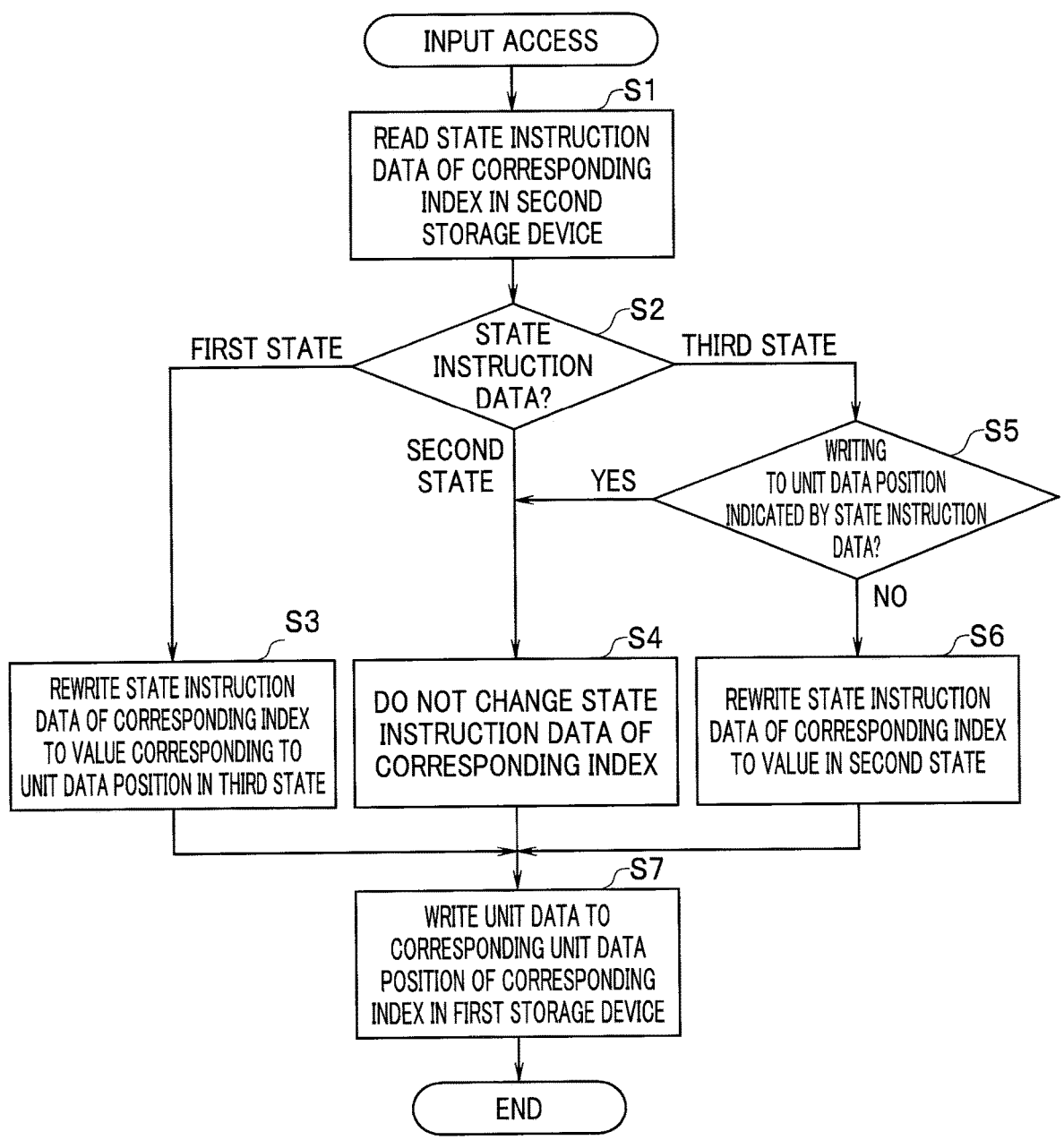
FIG. 6 is a flowchart illustrating processing performed by the write-back cache device when there is an input access according to the first embodiment.

FIG. 6 is a flowchart illustrating processing performed by the write-back cache device 2 when there is an input access.

The processing illustrated in FIG. 6 is executed when the cache controller 24 receives, as input access from the CPU 1, a write request including an address in the main memory 4 (refer to FIG. 3) and unit data UD.

The cache controller 24 decodes the address in the main memory 4 to extract a tag TG, an index IDX, and a cache line size LSZ and reads, from the second storage device 22, state instruction data SID of a cache line specified by the index IDX (step S1).

The cache controller 24 determines which of the first state, the second state, and the third state is indicated by the value of the read state instruction data SID (step S2).

When it is determined at step S2 that the first state is indicated, the cache controller 24 rewrites the state instruction data SID of the cache line to a value of a sub state corresponding to a position (position indicated by the cache line size LSZ extracted at step S1) of unit data UD to be newly written in the third state (step S3).

When it is determined at step S2 that the second state is indicated, the cache controller 24 does not change the state instruction data SID of the cache line because no change from the second state occurs even when new unit data UD is written to the cache line (step S4).

When it is determined at step S2 that the third state is indicated, the cache controller 24 determines whether the position of unit data UD to be newly written matches with the position of unit data UD that is already "dirty" (step S5).

When it is determined at step S5 that the position of unit data UD to be newly written matches with the position of unit data UD that is already "dirty", the cache controller 24 proceeds to step S4 described above and does not change the state instruction data SID of the cache line.

When it is determined at step S5 that the position of unit data UD to be newly written does not match with the position of unit data UD that is already "dirty", the cache controller 24 rewrites the value of the state instruction data SID of the cache line to a value ("15" in the example illustrated in FIG. 5) indicating the second state (step S6).

Having performed processing at step S3, S4, or S6, the cache controller 24 writes unit data UD at the unit data UD position in the cache line in the first storage device 21, and writes the tag TG extracted at step S1 in the cache line in the third storage device 23 (step S7).

Having performed processing at step S7, the cache controller 24 ends the processing illustrated in FIG. 6.

Figure 7:
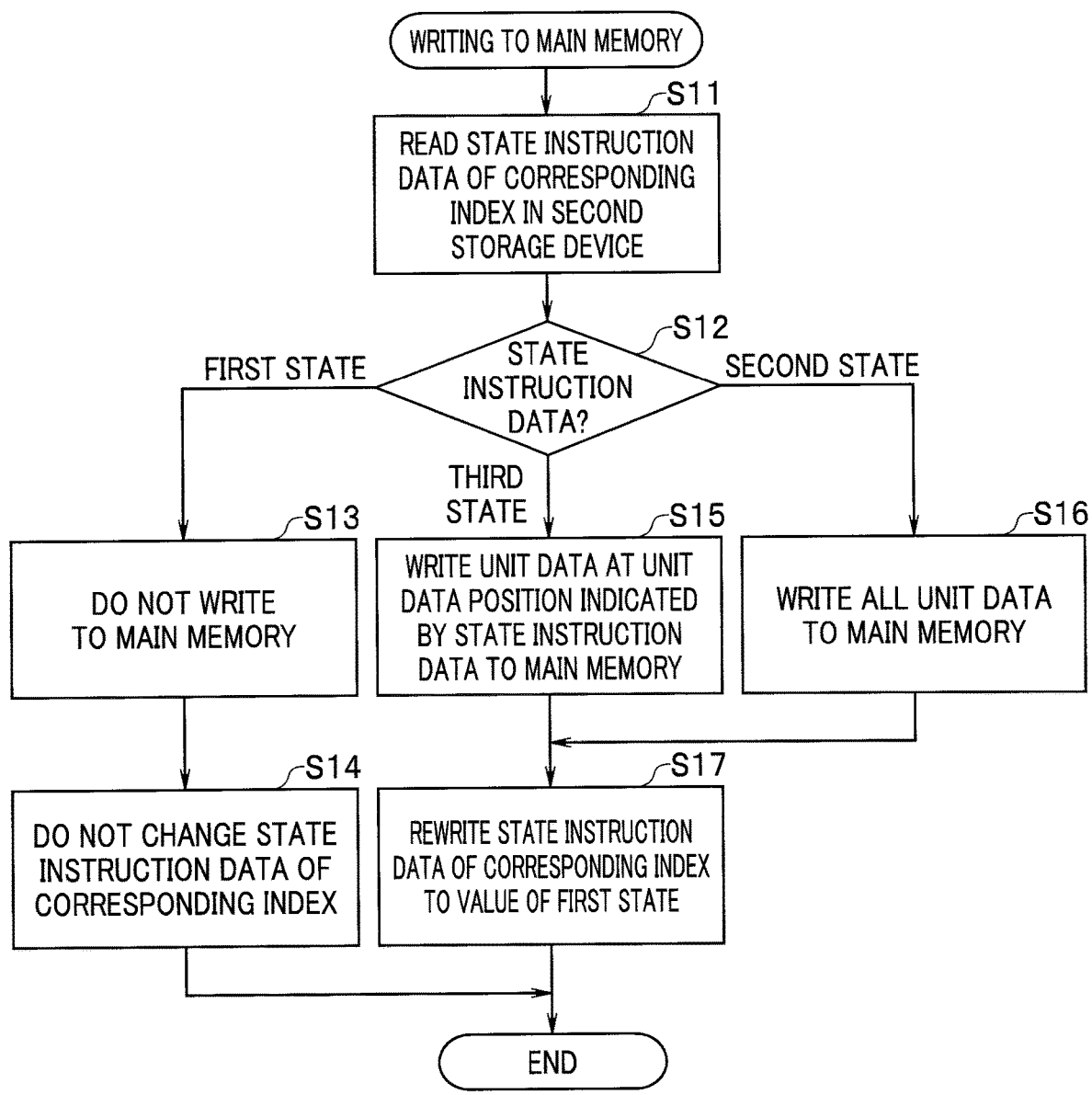
FIG. 7 is a flowchart illustrating processing of writing from the write-back cache device to the main memory according to the first embodiment.

FIG. 7 is a flowchart illustrating processing of writing from the write-back cache device 2 to the main memory 4. Write-back processing illustrated in FIG. 7 is performed on background in a duration in which no access to the main memory 4 is performed. The write-back processing illustrated in FIG. 7 is also performed when a new cache line is to be ensured in the write-back cache device 2 in response to a write request from the CPU 1 but there is no unused cache line.

Before writing unit data UD in a cache line in the first storage device 21 to the main memory 4, the cache controller 24 reads the state instruction data SID of the cache line from the second storage device 22 (step S11).

The cache controller 24 determines which of the first state, the second state, or the third state is indicated by the value of the read state instruction data SID (step S12).

When it is determined at step S12 that the first state is indicated, the cache controller 24 writes none of n pieces of unit data UD in the cache line to the main memory 4 (step S13) and does not change the value of the state instruction data SID of the cache line (step S14).

When it is determined at step S12 that the third state is indicated, the cache controller 24 writes only one piece of unit data UD to a position indicated by the state instruction data SID in the cache line to the main memory 4 (step S15).

When it is determined at step S12 that the second state is indicated, the cache controller 24 writes all n pieces of unit data UD in the cache line to the main memory 4 (step S16).

Having performed processing at step S15 or S16, the cache controller 24 rewrites the value of the state instruction data SID of the cache line to a value (in the example illustrated in FIG. 5, "0") indicating the first state (step S17).

Having performed processing at step S14 or S17, the cache controller 24 ends the processing illustrated in FIG. 7.

Figure 8:
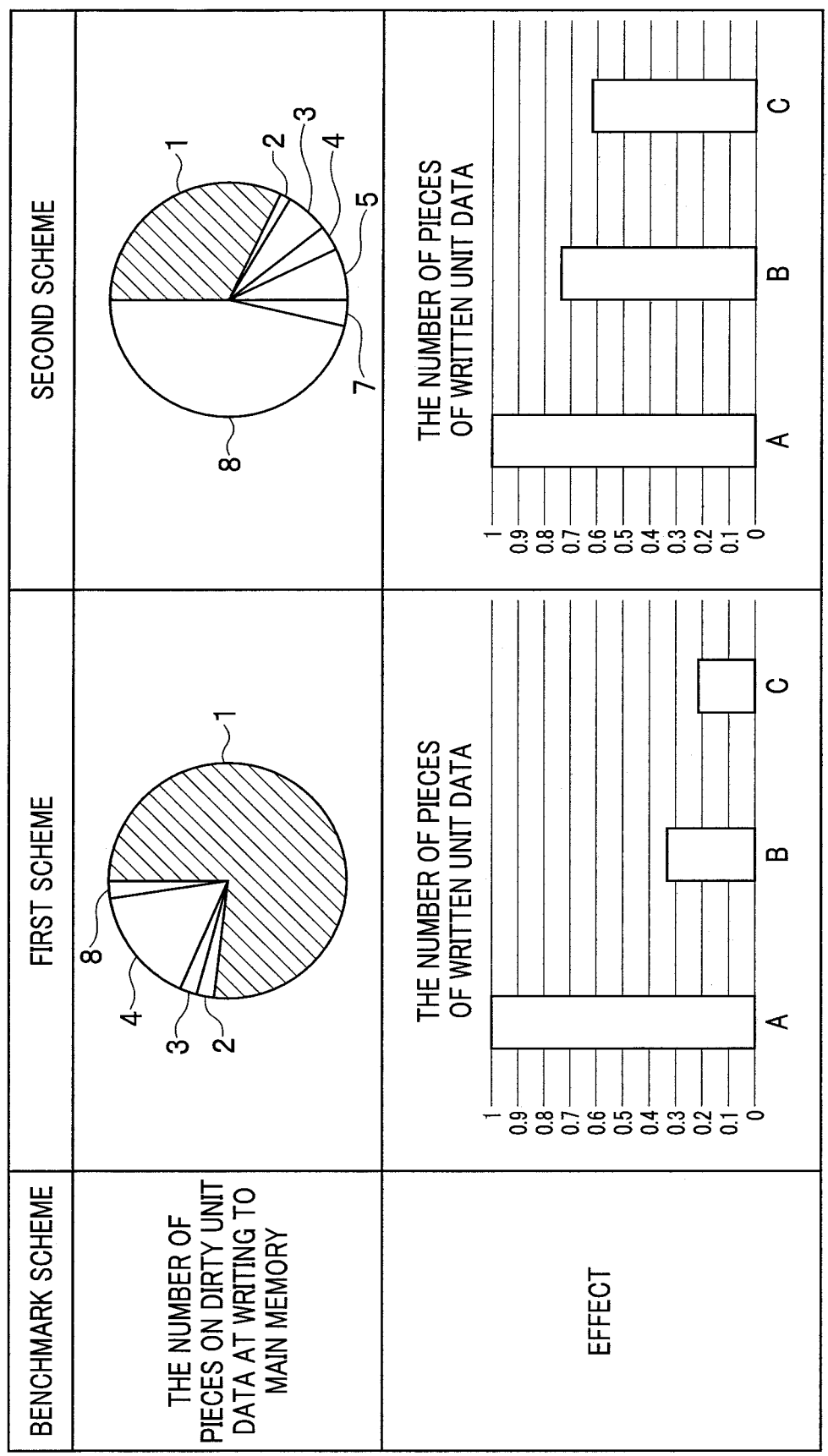
FIG. 8 is a table for description of effects of the write-back cache device according to the first embodiment.

FIG. 8 is a table for description of effects of the write-back cache device 2.

FIG. 8 illustrates a result of comparison of the amount of data (the number of pieces of unit data UD) written to the main memory 4 among Configuration A of the first comparative example (FIG. 11) in which one dirty bit DB corresponds to one cache line, Configuration B of the present embodiment (FIGS. 4 and 5) in which state instruction data SID of four bits corresponds to one cache line, and Configuration C of the second comparative example (FIG. 12) in which n dirty bits DB correspond to n pieces (in this example, n=8), respectively, of unit data UD in one cache line.

Note that two benchmark schemes are used to obtain the comparison results. With a first benchmark scheme, a fraction in which the number of pieces of dirty unit data UD at writing to the main memory 4 is one is equal to or larger than 75%. With a second benchmark scheme, the fraction in which the number of pieces of dirty unit data UD at writing to the main memory 4 is one is 30% approximately. For each benchmark scheme, a parameter such as a cache capacity is tuned so that a cache hit rate is 90% approximately.

With the first benchmark scheme, when the number of pieces of written unit data UD of Configuration A is normalized to one, the number of pieces of written unit data UD of Configuration B is 0.33 approximately, and the number of pieces of written unit data UD of Configuration C is 0.21 approximately. Thus, with Configuration B of the present embodiment, the amount of data written to the main memory 4 can be reduced by a little under 70% as compared to Configuration A, and effects relatively close to effects of Configuration C are obtained.

With the second benchmark scheme, when the number of pieces of written unit data UD of Configuration A is normalized to one, the number of pieces of written unit data UD of Configuration B is 0.74 approximately, and the number of pieces of written unit data UD of Configuration C is 0.62 approximately. With the second benchmark scheme, a fraction in which the number of pieces of dirty unit data UD at writing to the main memory 4 is equal to or larger than two is higher than the fraction of the first benchmark scheme. Accordingly, the number of pieces of written unit data UD is larger than the number of pieces of written unit data UD of the first benchmark scheme for each of Configurations B and C, but still, effects relatively close to effects of Configuration C are obtained with Configuration B of the present embodiment.

Note that the above description is made on an example in which the number n of pieces of unit data UD stored in one cache line is eight, but the configuration of the present embodiment is also applicable to a configuration of n=2 or larger, and in particular, the configuration of the present embodiment is effectively applicable to a configuration of n=3 or larger.

In a case of n=16 as an example of n #8, in the present embodiment, state instruction data SID can be configured with five bits, which is a minimum number of bits with which (n+2)=18 states can be distinguished from one another. However, 16 bits are needed for state instruction data SID with the configuration of FIG. 12, and thus the configuration of the present embodiment only needs a data amount less than ⅓ of a data amount with the configuration of FIG. 12. Accordingly, an effect of reduction of the circuit dimensions of the second storage device 22 due to the configuration of the present embodiment when compared with the configuration of FIG. 12 increases as n increases.

According to the first embodiment as described above, since state instruction data SID is configured with bits in a number less than n with which a total of (n+2) states of one first state, one second state, and n sub states in the third state can be distinguished from one another based on a research result that the fraction in which the number of pieces of dirty unit data UD in one cache line is one is high at writing to the main memory 4, it is possible to reduce the amount of data written to the main memory 4 and thus reduce the circuit dimensions of the second storage device 22.

In particular, when the second storage device 22 is configured with a flip-flop, a chip area for storing one-bit data is larger than a chip area for storing one-bit data when the second storage device 22 is configured with an SRAM. Thus, the chip area can be effectively reduced by using the configuration of the present embodiment with which the number of bits of state instruction data SID stored in one cache line in the second storage device 22 is reduced as compared to the configuration illustrated in FIG. 12.

In this case, it is possible to further reduce the circuit dimensions of the second storage device 22 and the chip area by configuring state instruction data SID as the minimum number of bits with which (n+2) states can be distinguished from one another.

Since, when unit data UD is to be written to a cache line, state instruction data SID is read and state instruction data SID after the unit data UD is written to the cache line is set in accordance with the read state instruction data SID, which of n pieces of unit data UD in the cache line is "dirty" can be accurately reflected on the state instruction data SID.

When the state instruction data SID has a value indicating the first state, none of the n pieces of unit data UD in the cache line are written to the main memory 4 and the state instruction data SID is not changed, and thus the amount of data written to the main memory 4 can be zero.

When the state instruction data SID has a value indicating the third state, only dirty unit data UD among the n pieces of unit data UD in the cache line is written to the main memory 4 and the value of the state instruction data SID is rewritten to the value indicating the first state, and thus the amount of data written to the main memory 4 can be reduced to a minimum.

Second Embodiment

A second embodiment will be described below with reference to FIGS. 9 and 10. In the second embodiment, a part same as a part of the first embodiment is, for example, denoted by the same reference sign, description of the part is omitted as appropriate, and any different point will be mainly described below.

The second storage device 22 in the second embodiment is configured with an SRAM or the like that cannot perform reading and writing in the same operation cycle.

With the configuration of the second comparative example illustrated in FIG. 12, processing of reading a dirty bit DB from the second storage device 22 before a dirty bit DB is written is unnecessary, and it is only needed to rewrite, to "dirty", a dirty bit DB corresponding to a position at which unit data UD is written.

However, with a configuration of state instruction data SID as illustrated in FIG. 5, bifurcation based on whether processing at step S3, S4, or S6 is to be performed occurs in accordance with results of determination on state instruction data SID at steps S2 and S5 as illustrated in FIG. 6. Thus, it is needed to read already written state instruction data SID before writing state instruction data SID to the second storage device 22.

Accordingly, stall occurs when input access that requests writing of unit data UD is performed in consecutive operation cycles in a case in which the second storage device 22 is configured with an SRAM. This will be described below with reference to FIG. 13. FIG. 13 is a timing chart illustrating a third comparative example in which stall occurs due to consecutive request for writing unit data UD. Note that each interval partitioned by dotted lines in FIGS. 10 and 13 indicates one operation cycle of the write-back cache device 2.

In a first operation cycle, when there is a first input access ($W_0$) that requests writing of unit data UD, the tag TG and the state instruction data SID of a cache line specified by an index IDX extracted from an address in the main memory 4 are read in the same operation cycle ($R_0$).

In a second operation cycle following the first operation cycle, the unit data UD is written at a corresponding position of the unit data UD in the cache line in the first storage device 21 ($W_0$). State instruction data SID corrected as necessary based on the state instruction data SID read at ($R_0$) is written to the second storage device 22 ($W_0$).

When second input access ($W_1$) that requests writing of unit data UD is performed in the second operation cycle, since the state instruction data SID is being written to the second storage device 22 ($W_0$), state instruction data SID cannot be read from the second storage device 22 in the second operation cycle ($R_1$).

Accordingly, stall occurs and the cache controller 24 receives the second input access ($W_1$) in a third operation cycle following the second operation cycle.

As a result, a tag TG and state instruction data SID are read in the third operation cycle ($R_1$), the unit data UD is written at a corresponding position of the unit data UD in the cache line in a fourth operation cycle following the third operation cycle ($W_1$) and state instruction data SID is written to the second storage device 22 ($W_1$) as described above for the first and second operation cycles.

In this manner, when stall occurs, input access cannot be handled in consecutive operation cycles and delay occurs, which degrades performance of the write-back cache device 2.

Processing of the present embodiment performed to address such a problem will be described below with reference to FIG. 9. FIG. 9 is a flowchart illustrating processing performed by the write-back cache device 2 when there is an input access.

When having received input access, the cache controller 24 determines whether the input access is performed in consecutive operation cycles based on whether the input access is also performed in a previous operation cycle (step S21).

When it is determined that the input access is not performed in consecutive operation cycles (NO), operation of steps S1 to S7 described with reference to FIG. 6 is performed.

When it is determined at step S21 that the input access is performed in consecutive operation cycles (YES), the cache controller 24 proceeds to step S6 and rewrites the value of the state instruction data SID of a corresponding cache line to a value indicating the second state. A specific example of positive determination at step S21 is a case in which input access ($W_0$) is performed in the first operation cycle and input access ($W_1$) is performed in the second operation cycle as illustrated in FIG. 10.

Note that a consecutive request for writing of unit data UD is often performed to nearby addresses in the main memory 4. Accordingly, the second input access of consecutive input accesses is highly likely to be performed to a cache line same as a cache line to which the first input access is performed, and the cache line is highly likely to become the second state. Thus, when the cache controller 24 proceeds to step S6 in a case of the positive determination at step S21, the amount of data written to the main memory 4 is unlikely to be increased as compared to a case in which the processing at step S3 is performed.

Figure 9:
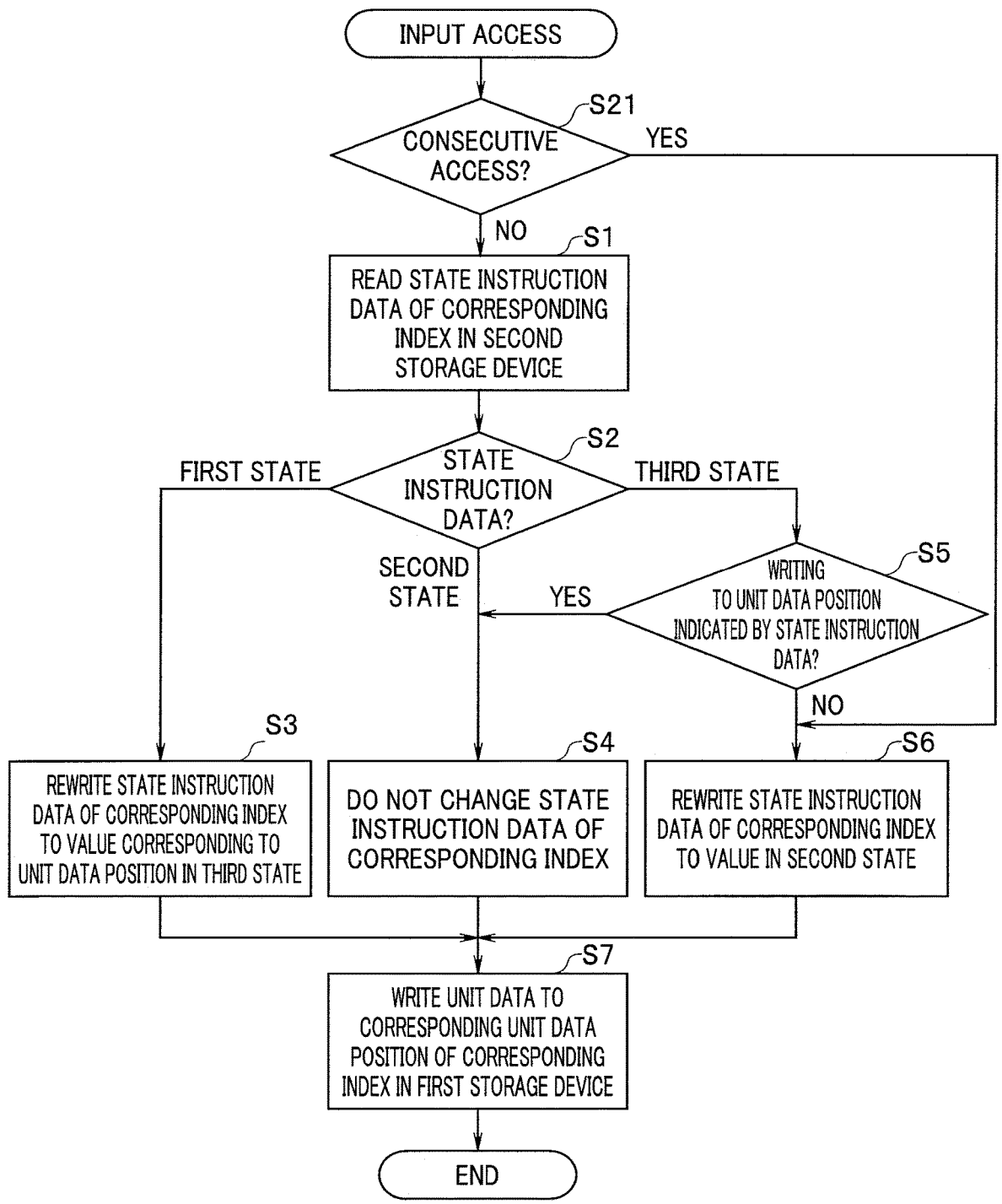
FIG. 9 is a flowchart illustrating processing performed by the write-back cache device when there is an input access according to a second embodiment.

Thereafter, having performed the processing at step S7, the cache controller 24 ends the processing illustrated in FIG. 9.

Figure 10:
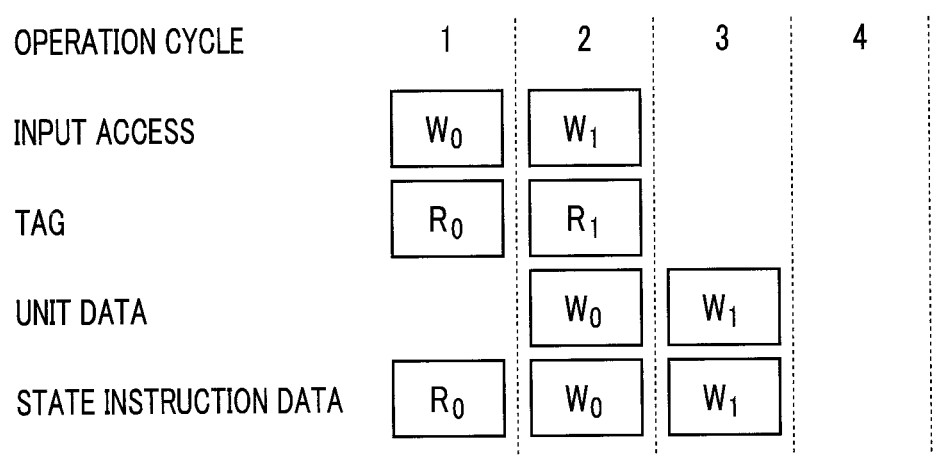
FIG. 10 is a timing chart illustrating an example in which stall occurrence is avoided by not reading the state instruction data when there is a consecutive request for writing of unit data in the write-back cache device according to the second embodiment.

FIG. 10 is a timing chart illustrating an example in which stall occurrence is avoided by not reading state instruction data SID when there is a consecutive request for writing of unit data UD in the write-back cache device 2 according to the present embodiment.

Operation in a first operation cycle is same as operation in the first operation cycle in the example described with reference to FIG. 13. Specifically, when there is a first input access in the first operation cycle, the cache controller 24 reads, in the first operation cycle, a tag TG and state instruction data SID related to a cache line on which the first input access is performed ($R_0$).

In a second operation cycle following the first operation cycle, the unit data UD is written at a corresponding position of the unit data UD in a corresponding cache line in the first storage device 21 ($W_0$). State instruction data SID corrected as necessary based on the state instruction data SID read at ($R_0$) is written to the second storage device 22 ($W_0$).

In addition, in the second operation cycle, second input access ($W_1$) that requests writing of unit data UD is performed, but reading of state instruction data SID in the second operation cycle is omitted (step S1 is skipped in case of YES at step S21), and thus the second input access ($W_1$) is received and a tag TG is read ($R_1$).

In a third operation cycle following the second operation cycle, the unit data UD is written at the corresponding position of the unit data UD in the corresponding cache line in the first storage device 21 ($W_1$) and state instruction data SID is written to the second storage device 22 ($W_1$) as described above for the fourth operation cycle illustrated in FIG. 13. However, the state instruction data SID written to the second storage device 22 at ($W_1$) has the value indicating the second state (since the cache controller 24 proceeds to step S6 in case of YES at step S21).

In this manner, when there is a second input access in the second operation cycle following the first input access in the first operation cycle, the cache controller 24 does not read state instruction data SID in the second operation cycle but performs, in the third operation cycle following the second operation cycle, processing of rewriting the value of state instruction data SID related to a cache line to which the second input access is performed to the value indicating the second state.

According to the second embodiment thus configured, effects substantially same as effects of the above-described first embodiment are obtained. In addition, when there is a consecutive input access in the first and second operation cycles, state instruction data SID is not read in the second operation cycle but the value of state instruction data SID is rewritten to the value indicating the second state in the third operation cycle. Thus, it is possible to avoid stall occurrence when the second storage device 22 is configured with an SRAM or the like and maintain fast operation of the write-back cache device.

While certain embodiments have been described, these embodiments have been presented by way of example only, and are not intended to limit the scope of the inventions. Indeed, the novel devices described herein may be embodied in a variety of other forms; furthermore, various omissions, substitutions and changes in the form of the devices described herein may be made without departing from the spirit of the inventions. The accompanying claims and their equivalents are intended to cover such forms or modifications as would fall within the scope and spirit of the inventions.

What is claimed is:

1. A write-back cache device comprising:
a first storage device capable of storing n (n is an integer equal to or larger than two) pieces of unit data in each of a plurality of cache lines, each piece of unit data being a unit of writing to a main memory;
a second storage device configured to store state instruction data in each of the plurality of cache lines; and
a cache controller configured to control inputting to and outputting from the first and second storage devices, wherein
in a first state in which n pieces of unit data stored in a first cache line in the first storage device are not different from data stored at a first address in the main memory, the first address corresponding to the first cache line, first state instruction data in the first cache line has a first value,
in a second state in which two or more pieces of unit data among the n pieces of unit data stored in the first cache line are different from data stored at the first address, the first state instruction data has a second value, and
when one piece of unit data among the n pieces of unit data stored in the first cache line is first unit data in a third state in which only the one piece of unit data is different from data stored at the first address, the first state instruction data has a third value.

2. The write-back cache device according to claim 1, wherein when the one piece of unit data is second unit data different from the first unit data in the third state, the first state instruction data has a fourth value.

3. The write-back cache device according to claim 1, wherein in a third state in which only one piece of unit data among the n pieces of unit data stored in the first cache line is different from data stored at the first address, the first state instruction data has a value different for each piece of unit data having the difference.

4. The write-back cache device according to claim 2, wherein the state instruction data is configured with bits in a number smaller than n with which a total of (n+2) states of the first state, the second state, and n sub states each corresponding to one of the n pieces of unit data that is the one piece of unit data in the third state can be distinguished from one another.

5. The write-back cache device according to claim 2, wherein the state instruction data is configured with a minimum number of bits with which a total of (n+2) states of the first state, the second state, and n sub states each corresponding to one of the n pieces of unit data that is the one piece of unit data in the third state can be distinguished from one another.

6. The write-back cache device according to claim 2, wherein the cache controller
reads the first state instruction data from the second storage device when receiving an input access requesting for writing of the first unit data to the first cache line;
rewrites the first state instruction data to the third value when the first state instruction data has the first value;
does not change the first state instruction data when the first state instruction data has the second value,
does not change the first state instruction data when the first state instruction data has the third value, and
rewrites the first state instruction data to the second value when the first state instruction data has the fourth value.

7. The write-back cache device according to claim 1, wherein
when first input access is performed in a first operation cycle, the cache controller reads, in the first operation cycle, state instruction data of a cache line to which the first input access is performed,
when a second input access to the first cache line is performed in a second operation cycle following the first operation cycle, the cache controller does not read the first state instruction data in the second operation cycle, and
in a third operation cycle following the second operation cycle, the cache controller rewrites the first state instruction data to the second value.

8. The write-back cache device according to claim 1, wherein
the cache controller reads the first state instruction data from the second storage device in write-back operation to write unit data in the first cache line to the main memory,
when the first state instruction data has the first value, the cache controller writes none of the n pieces of unit data in the first cache line to the main memory and does not change the first state instruction data,
when the first state instruction data has the second value, the cache controller writes the n pieces of unit data in the first cache line to the main memory and rewrites the first state instruction data to the first value, and
when the first state instruction data has the third value, the cache controller writes the first unit data to the main memory and rewrites the first state instruction data to the first value.

* * * * *